Patented Nov. 15, 1932

1,887,812

UNITED STATES PATENT OFFICE

MAX ALBERT KUNZ, OF MANNHEIM, GEORG KRAENZLEIN, OF FRANKFORT-HOCHST-ON-THE-MAIN, KARL KOEBERLE, OF LUDWIGSHAFEN-ON-THE-RHINE, MARTIN CORELL, OF FRANKFORT-HOCHST-ON-THE-MAIN, ERICH BERTHOLD, OF LUDWIGSHAFEN-ON-THE-RHINE, AND HEINRICH VOLLMANN, OF FRANKFORT-HOCHST-ON-THE-MAIN, GERMANY, ASSIGNORS TO GENERAL ANILINE WORKS INC., OF NEW YORK, N. Y., A CORPORATION OF DELAWARE

VAT DYESTUFF

No Drawing. Application filed April 16, 1929, Serial No. 355,654, and in Germany June 30, 1928.

The present invention relates to the production of vat dyestuffs of the dibenzopyrenequinone series.

It is already known that halogen can be introduced in 3.4.8.9-dibenzopyrene-5.10-quinone by means of halogens or halogenating agents with or without the aid of halogen transferrers. Some of the halogen derivatives thus obtained are themselves vat dyestuffs and others are valuable intermediate products for the manufacture of dyestuffs. All these products, however, in so far as they are dyestuffs at all, are not very suitable for dyeing purposes in practice, because they dye rather dull shades which, moreover, are not sufficiently fast. It is also known that uniform 1.6 - dihalogen - 3.4.8.9-dibenzopyrene-5.10-quinones are obtained by treating 1.5-dibenzoyl - 2.6 - dihydroxynaphthalene with phosphorus halides. The resulting dyestuffs have dyeing properties similar to those of the unsubstituted 3.4.8.9 - dibenzopyrene - 5.10 - quinone which, though they are valuable in many respects, do not meet all requirements of practice.

We have now found that new products, containing halogen and having excellent dyeing properties, are obtained by treating 3.4.8.9-dibenzopyrene-5.10-quinone or derivatives thereof, which initial materials correspond to the general formula

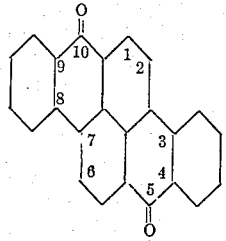

in sulphuric acid or derivatives thereof, such as fuming sulphuric acid and in particular chlorsulphonic acid, with halogens or agents supplying the same in the presence of a halogen-transferring catalyst under such conditions of working as to prevent an undue attack of the initial material and the final product. It has been found that these conditions of working depend largely on the temperature employed. The temperature may be the lower, the more reactive the halogen is; therefore, in the case of chlorine, it may be as low as 50° C., whereas in the case of bromine it will usually be about 60° C., and in the case of iodine still higher temperatures, such as 110° C. and more will be necessary. It has also been found that at higher temperatures, say at about 80° C. to 85° C. or more, the 3.4.8.9-dibenzopyrene-5.10-quinone is not entirely resistant to the action of the sulphuric acids employed, these giving rise to the formation of sulphonated products and other by-products impairing the properties of the final product. It is, however, possible to carry out the reaction at such high temperatures, provided it is completed in as short a time as possible, whereby the said action of the sulphuric acids is avoided. With this object in view, either an addition of comparatively large quantities of the halogen-transferring catalyst, such as iodine or sulphur may be made, or the halogen is rapidly introduced into the reaction mixture, or an excess thereof employed, or several of these measures may be used. It results from the foregoing that the most favorable temperature is not higher than about 80° or 85° C. in the case of bromination or chlorination; when working below the said limit, small quantities of the catalyst, for example 0.1 to 0.5 per cent by weight, calculated on the amount of the dibenzopyrene-quinone, are sufficient for the production of products dyeing clear yellow shades; if however, products possessing the most desirable shades and the highest coloring power are to be made, it is advisable to employ considerably larger amounts of the catalyst. Valuable products are also obtained at higher temperatures, in which case one or more of the aforesaid precautions must be taken; for instance, the amount of catalyst employed may be as high as 2, 3, 5 or still much more per cent by weight, calculated on the dibenzopyrene-quinone. It will be seen that the conditions of working are mutually interdependent; they must be so restricted as to time or temperature and so on that no sulphonation or other undesirable change of the initial materials occurs;

for the sake of simplicity of language, we shall therefore speak in the following and in the appended claims of "restricted conditions", and it will now be understood what we mean by this term. In order to make the matter still clearer, we shall now explain our method by reference to a typical case, namely the production of dibromo-3.4.8.9-dibenzopyrene-5.10-quinone. When 3.4.8.9-dibenzopyrene-5.10-quinone is dissolved, for example in chlorsulphonic acid, and acted upon with bromine, the reaction may be carried out with 1 to 1.25 molecular proportions of bromine per each molecular proportion of the dibenzopyrene-quinone with the aid of from 2 to 10 per cent of a catalyst, such as iodine, and in the course of only a few hours at temperatures of about 80° C., a dibrominated product of highest qualities being obtained. When working at lower temperatures, such as from 60° to 70° C. a larger amount of bromine and a prolonged time of reaction, for example 20 hours or even more, is suitable. At higher temperatures of for example 85° to 100° C. the time of reaction must be reduced to a minimum, and preferably agents counteracting sulphonation, such as iodine or sulphur are added. At still higher temperatures, still more precaution is necessary. Further typical cases of the restricted conditions will be given hereinafter in the examples.

As pointed out in the foregoing, the reaction may be carried out in sulphuric acid or derivatives thereof, such as fuming sulphuric acid and in particular chlorsulphonic acid. When in the claims hereunto appended we speak of sulphuric acid solution, we wish it to be understood that this term is also to cover solutions in the derivatives of sulphuric acid. It should be noted that chlorosulphonic acid is a particularly good solvent for the purposes of our present invention. When employed at high temperatures, such as about 85° C. or above, chlorination may take place to a smaller or greater extent due to the action of the chlorsulphonic acid.

As regards the catalysts employed in our process, any of the well-known halogen-transferring catalysts may be used for this purpose, but particularly good results are obtained with such catalysts as, for example, iodine, mercury, selenium, sulphur, antimony or bismuth, and of these iodine is the most valuable catalyst. The number of halogen atoms which enter the molecule, depends on the quantity of halogen, but in some cases also the quantity and nature of the catalyst and the nature of the solvent is of importance. This fact becomes particularly evident when working with iodine as a catalyst in chlorsulphonic acid. These two agents in conjunction appear to have oxidizing properties, whereby the hydrogen halide formed during the halogenation is oxidized to free halogen. Accordingly, whereas usually in halogenations one molecule of the halogen is required for each one atom of halogen to be introduced, it may be observed that with the aid of only one molecule of halogen, two halogen atoms are introduced into the dyestuff molecule as mentioned above. In other cases, a slight excess of halogen, for example 1.25 atoms may be required for introducing one halogen atom. In some cases it may be of advantage to employ two or more catalysts simultaneously or consecutively.

According to the present invention, several different halogens may also be introduced into the dibenzopyrene-quinone molecule. For example, we may first chlorinate the initial material, and then introduce bromine into the resulting product. The two operations may also be carried out in the inverse order by first brominating and then chlorinating. Or both operations may be carried out simultaneously.

The chloro-, bromo-, or chlorobromo-3.4.8.9-dibenzopyrene-5.10-quinones thus obtained dissolve in concentrated sulphuric acid, usually to give solutions of blue or violet color. They form vats which are usually violet or red. They are soluble with great difficulty in organic solvents of high boiling point, such as nitrobenzene, halogenbenzenes, for example mono- or trichlorbenzene, quinoline, nitronaphthalene and the like, and may be purified by crystallization therefrom or by fractional precipitation from their solutions in sulphuric acid by means of water or dilute acid. Generally speaking, the chloro derivatives dye more greenish yellow shades and the corresponding bromo and chlorobromo derivatives considerably more reddish shades than the parent substance.

However, as already indicated above, the present invention is not restricted to the production of such chloro-, bromo- or chlorobromo-3.4.8.9-dibenzopyrene-5.10-quinones, but we may also produce similar iodo-derivatives. For instance, we may introduce iodine into an initial material free from halogen, in which case the resulting products may, if so desired, be further halogenated by treatment with chlorine or bromine or agents supplying the same. Or we may start from 3.4.8.9-dibenzopyrene-5.10-quinones which contain chlorine or bromine or both, and introduce iodine into these compounds. The new products containing iodine possess, generally speaking, very valuable properties like the aforedescribed halogenated dyestuffs. Generally, their solutions in concentrated sulphuric acid and their vats have the same color as those of the abovementioned products, whereas the dyeings of the products containing iodine are of an even more reddish tinge than those of the bromo- and chloro-bromo-3.4.8 9.-dibenzopyrene-5.10-quinones.

The new products obtainable according to the present invention give dyeings of extraordinary clearness from the vat. Their coloring power is substantially greater, often about twice or even more, than that of the initial materials free from halogen and of the known 1.6-dihalogen-3.4.8.9-dibenzopyrene-5.10-quinones; also their properties as regards fastness are much better than those of the said known products; they are particularly distinguished by their excellent fastness to light and to boiling with solutions of soap or soda, and they also possess a very good affinity to vegetable fibre. Particularly valuable products obtainable according to the present invention are those containing from two to three halogen atoms in the 3.4.8.9-dibenzopyrene-5.10-quinone molecule. They give particularly bright, clear dyeings, and are also very readily vatted.

Generally speaking, it is of no importance, whether crude or pure 3.4.8.9-dibenzopyrene-5.10-quinones are used as starting materials, but it may in some cases be of advantage to employ a pure initial material, because in this case the final products are particularly free from impurities which might cause trouble in their application for dyeing, though as a rule the impurities are insoluble in the vats. Such impurities may, however, also be removed by purifying the products obtained from crude initial material.

The difference between, for example, the known 1.6-dichloro derivative and the dichloro derivatives obtainable according to this invention and also the difference between products obtained according to this invention under different conditions of working are probably due to the defferent positions of the chlorine atoms; but we do not wish to bind ourselves to this explanation.

The constitution of the new products has not yet been ascertained, only the number of halogen atoms contained in the dyestuff molecule being known. For this reason no formulæ of the products are given in the following examples, which will further illustrate the nature of the present invention, but to which examples our invention is not restricted. The parts are by weight.

*Example 1*

33.2 parts of 3.4.8.9-dibenzopyrene-5.10-quinone, prepared, for example, according to the U. S. Patent No 1,564,584, are dissolved, while stirring, in 332 parts of chlorsulphonic acid, and 3 parts of iodine are added The temperature is then slowly raised to from 65° to 70° C. and dry chlorine gas is passed in for from 1½ to 2 hours. The whole is then allowed to cool, the solution is then diluted with 150 parts of concentrated sulphuric acid, poured on ice and filtered by suction while hot. The resulting dyestuff, which is a trichlor-3.4.8.9-dibenzopyrene-5.10-quinone, is obtained in a very good yield in the form of a yellow powder. It dissolves in concentrated sulphuric acid giving a violet coloration. It crystallizes from nitrobenzene in small yellow needles and gives very strong greenish yellow dyeings of very good fastness on cotton from a violet red vat.

*Example 2*

30 parts of 3.4.8.9-dibenzopyrene-5.10-quinone in 300 parts of chlorosulphonic acid are treated at ordinary temperature, that is about 16° to 20° C., with 3 parts of iodine and 17 parts of bromine. The whole is then warmed up to from 65° to 70° C. and is kept at this temperature until the major portion of the bromine is absorbed. The whole is then allowed to cool, diluted with 150 parts of concentrated sulphuric acid, poured onto ice, and worked up as described in Example 1. The bromo-3.4.8.9-dibenzopyrene-5.10-quinone containing 1.75 atoms of bromine so obtained dissolves in concentrated sulphuric acid producing a violet coloration and gives very clear golden yellow dyeings with a strong reddish tinge of very good fastness from a red violet vat.

When working under the above conditions, but at from 80° to 85° C. a dibromo derivative is obtained.

*Example 3*

A solution of 125 parts of crude 3.4.8.9-dibenzopyrene-5.10-quinone in 1250 parts of chlorosulphonic acid is heated slowly after the addition of 9 parts of iodine and 100 parts of bromine, with stirring, up to from 65° to 70° C. and is maintained at this temperature until the major portion of the bromine is absorbed. The whole is then allowed to cool and worked up in the customary manner. The dyestuff, dibromo-3.4.8.9-dibenzopyrene-5.10-quinone, obtained as a yellow orange powder, dissolves in concentrated sulphuric acid to give a violet coloration, and crystallizes from nitrobenzene in orange red needles of the fineness of hair. It gives extremely bright reddish yellow dyeings on cotton from a red vat, the said dyeings surpassing those of the unhalogenated initial material from 2 to 2½ times as regards color strength.

Dyestuffs having similar dyeing properties, but containing more bromine, are obtained by employing larger quantities of bromine.

When using mercury instead of iodine as a catalyst, a product dyeing similar shades is obtained.

*Example 4*

33.2 parts of 3.4.8.9-dibenzopyrene-5.10-quinone are dissolved while stirring in 350 parts of 12 per cent oleum and after the addition of 3 parts of iodine, are treated with 100 parts of bromine. The temperature is then raised to from 65° to 70° C. and maintained thereat until the bulk of the bromine is absorbed. After cooling, the product is worked up in the usual manner. The dyestuff, obtained as an orange yellow powder, which is a dibromo-3.4.8.9-dibenzopyrene-5.10-quinone, dissolves in concentrated sulphuric acid to give a violet coloration and gives dyeings similar to those of the dyestuff prepared according to Example 3.

By employing antimony, sulphur or selenium instead of iodine as the catalyst in the above example products of similar fastness properties but giving somewhat less reddish dyeings are obtained.

*Example 5*

33.2 parts of 3.4.8.9-dibenzopyrene-5.10-quinone are dissolved in 332 parts of chlorosulphonic acid and, at about 16° to 20° C., 2 parts of iodine and 8.8 parts of bromine are added, while stirring. The temperature is then raised to from 65° to 70° C., and the mixture is stirred, until the whole of the bromine is absorbed. After cooling, the product is worked up in the usual manner. The resulting monobromo-3.4.8.9-dibenzopyrene-5.10-quinone, an orange yellow powder, crystallizes from high boiling solvents in fine orange red needles, dissolves in concentrated sulphuric acid with the formation of a violet solution and gives very fast yellow dyeings with a reddish tinge on cotton from a red vat with a blue tinge.

*Example 6*

33 parts of pure 3.4.8.9-dibenzopyrene-5.10-quinone (obtainable, for example, by sublimation of crude 3.4.8.9-dibenzopyrene-5.10-quinone) are dissolved in 330 parts of chlorosulphonic acid, while stirring. 1.65 to 2.3 parts of iodine are then added, 20 parts of bromine are run in at room temperature, and then the temperature is slowly raised to from 70° to 80° C. As soon as the bulk of the bromine is absorbed, the solution is allowed to cool, diluted with 200 parts of concentrated sulphuric acid, poured onto ice, and the acid paste is then boiled for a short time by introducing steam and filtered by suction. The resulting dibromo-3.4.8.9-dibenzopyrene-5.10-quinone possesses tinctorial properties similar to those of the dyestuff obtainable according to Example 3, after the same has been recrystallized.

If a 3.4.8.9-dibenzopyrene-5.10-quinone purified by crystallization be employed instead of sublimated 3.4.8.9-dibenzopyrene-5.10-quinone, a dyestuff is obtained, which possesses similar tinctorial properties.

The same dyestuff is obtained by employing 3 parts of mercury as a catalyst, 40 parts of bromine and heating to about 60° to 70° C. only.

*Example 7*

33.2 parts of pure 3.4.8.9-dibenzopyrene-5.10-quinone, such as may be obtained by sublimating or crystallizing crude 3.4.8.9-dibenzopyrene-5.10-quinone or boiling it with high boiling organic solvents, are dissolved in 330 parts of chlorsulphonic acid, while stirring. After addition of 3 parts of iodine, the temperature is raised to from 60° to 65° C., and a current of dry chlorine gas is introduced, until a sample of the reaction product dissolves in concentrated sulphuric acid forming a pure blue solution. The whole is then allowed to cool and worked up as described in Example 6. The reaction product which is obtained in an excellent yield is a hexachloro-3-4.8.9-dibenzopyrene-5.10-quinone, and gives clear greenish yellow dyeings of very good fastness on vegetable fibres from a violet vat.

If the reaction be interrupted as soon as a sample of the reaction product dissolves in sulphuric acid to give a violet solution, and the whole is worked up in the usual manner, a dichloro-3.4.8.9-dibenzopyrene-5.10-quinone is obtained, which dyes cotton yellow shades from a reddish violet vat. A tetrachloro derivative is obtained from 3.4.8.9-dibenzopyrene-5.10-quinone is a similar manner; this product dissolves in concentrated sulphuric acid with the formation of a blue solution with a reddish tinge and, when dissolved in oleum, it gives a solution of pure color; it dyes cotton yellow shades with a greenish tinge of very good fastness from a violet vat with a reddish tinge.

*Example 8*

33.2 parts of pure 3.4.8.9-dibenzopyrene-5.10-quinone, prepared, for example, from the oxonium salt separating from the sulphuric acid solution of the dibenzopyrenequinone, in 332 parts of chlorsulphonic acid are mixed, while stirring, with 40 parts of bromine at about 16° to 20° C. after the addition of 1.6 parts of iodine. The mixture is then slowly warmed to about 85° C. and kept at this temperature until a sample of the reaction product dissolves in concentrated sulphuric acid with the formation of a violet solution. The reaction product is then worked up in the usual manner. The resulting dyestuff, dibromo-3.4.8.9-dibenzopyrene-5.10-quinone, which is an orange red powder dyes cotton from a red vat strong yellow orange shades of an excellent fastness.

A dyestuff of a slightly more yellowish shade is obtained by employing instead of 1.6 parts of iodine the same amount of sulphur or mercury or bismuth as a catalyst.

*Example 9*

33.2 parts of pure 3.4.8.9-dibenzopyrene-5.10-quinone in 330 parts of chlorosulphonic acid are mixed with 3 parts of iodine and 20 parts of bromine and heated for a short time, say for 1 to 1½ hours, to a temperature between about 110° and 120° C. After cooling, the reaction product is worked up as usual. The resulting dichloro-dibromo-dibenzopyrene-quinone dissolves in concentrated sulphuric acid with a violet blue coloration and dyes cotton from a violet red vat strong reddish yellow shades.

When working at still higher temperatures it is preferable to heat for a shorter period of time, say for half an hour only, and to make an addition of still greater quantities of one are more catalysts.

*Example 10*

33.2 parts of pure 3.4.8.9-dibenzopyrene-5.10-quinone obtainable by boiling the crude product with organic solvents, such as nitrobenzene or trichlorbenzene, are heated to 85° to 90° C. in 320 parts of chlorsulphonic acid, while stirring after adding 0.35 part of iodine. Thereupon 25 parts of bromine are run in and stirring is continued until the bulk of the bromine has been taken up. After cooling, the reaction product is worked up in the usual manner. The resulting dibromo-3.4.8.9-dibenzopyrene-5.10-quinone, which also contains a little chlorine, is a yellow orange powder and dyes somewhat yellower shades than the dyestuff obtained according to Example 6 which dyes otherwise with quite similar properties.

*Example 11*

24.5 parts of the dyestuff obtainable according to Example 6 are heated to from 75° to 80° C. in 300 parts of chlorosulphonic acid after adding 10 parts of iodine and 10 parts of bromine. The mixture is kept at the said temperature until a sample of the reaction product dissolves in concentrated sulphuric acid with a pure blue coloration. The reaction product is then worked up as usual. The resulting tribromo-dichloro-3.4.8.9-dibenzo-pyrene-5.10-quinone dyes cotton from a violet vat strong golden yellow shades of excellent fastness.

*Example 12*

33.2 parts of 3.4.8.9-dibenzo-pyrene-5.10-quinone are dissolved in 332 parts of sulphuric acid monohydrate and heated to about 150° C., whereupon 25.4 parts of iodine are slowly added, while stirring. The said temperature is maintained until the formation of the dyestuff is complete. After cooling, the reaction product is poured onto ice, filtered by suction and the residue is dried. The resulting dyestuff which contains between 1 and 2 atoms of iodine per molecule, is a reddish yellow powder and crystallizes from nitrobenzene in the form of long yellowish red needles. It dissolves in concentrated sulphuric acid with a yellow blue coloration and dyes cotton from a violet vat very clear reddish yellow shades.

Instead of iodine a corresponding amount of iodine chloride may be used.

In the reaction described in this example the iodine added or formed during the reaction acts simultaneously as a catalyst.

*Example 13*

41 parts of monobromo-3.4.8.9-dibenzopyrene-5.10-quinone are dissolved in 400 parts of sulphuric acid monohydrate and are then treated at 150° C. with 25 parts of iodine, while stirring in the manner described in Example 12. The product is worked up in the usual manner. The resulting monoiodo-monobromo-3.4.8.9-dibenzopyrene-5.10-quinone which is in the form of a yellowish red powder, dissolves in concentrated sulphuric acid with a blue coloration with a violet tinge and dyes cotton clear, very fast yellowish red shades from a blue red vat.

A dyestuff of similar properties is obtained when brominating 3.4.8.9-dibenzopyrene-5.10-quinone in fuming sulphuric acid in the manner described in Example 4, and subsequently carrying out the introduction of iodine in the same solution in the manner described in Example 12.

*Example 14*

8 parts of bromine are added to a solution of 36 parts of monomethoxy-3.4.8.9-dibenzo-pyrene-5.10-quinone (obtainable by methylating the corresponding monohydroxy derivative prepared by boiling a solution of the diazotized reduction production of mono-nitro-3.4.8.9-dibenzopyrene-5.10-quinone) in 360 parts of chlorsulphonic acid at 0° C. after the addition of 3 parts of iodine. The whole is stirred for some time at the said temperature, stirring being continued at ordinary temperature until the bromine is completely taken up. After dilution with sulphuric acid, the reaction mixture is poured into ice-cold water and filtered by suction. The dyestuff obtained, mono-bromo-mono-methoxy-3.4.8.9-dibenzopyrene-5.10-quinone, is an orange powder dissolving to a blue solution in concentrated sulphuric acid and dyes cotton fast and clear orange shades from a red vat.

*Example 15*

33.2 parts of pure 3.4.8.9-dibenzopyrene-5.10-quinone are dissolved while stirring in 300 parts of sulphuric acid containing 23 per cent of sulphur trioxide and slowly heated to between 110° and 115° C. after the addition of 3 parts of iodine and 40 parts of bromine. After the bulk of the bromine has been consumed, the reaction mixture is allowed to cool and worked up as usual. The dyestuff of which an excellent yield is obtained, is a tetrabromo-3.4.8.9-dibenzopyrene-5.10-quinone according to analysis, forms an orange powder when dry, crystallizes in fine needles from nitrobenzene, dissolves to a blue solution in concentrated sulphuric acid and dyes cotton strong orange shades from a violet red vat.

Dyestuffs of similar tinctorial properties are obtained by employing as catalyst 0.3 part of mercury or sulphur instead of iodine.

Example 16

33.2 parts of 3.4.8.9-dibenzopyrene-5.10-quinone are dissolved in 330 parts of chlorosulphonic acid and 8.5 parts of bromine are run in at ordinary temperature after the addition of 3 parts of iodine while stirring. The whole is then slowly heated to about 90° to 95° C. and kept at this temperature for about 6 hours. The reaction mixture is then worked up as usual. The monobromo-monochloro-3.4.8.9-dibenzopyrene-5.10-quinone obtained dissolves in concentrated sulphuric acid to a violet solution and dyes cotton from a blue red vat strong and bright yellow orange shades.

Example 17

Chlorine is passed into a solution of 33.2 parts of 3.4.8.9-dibenzopyrene-5.10-quinone in 330 parts of chlorosulphonic acid to which 3 parts of iodine have been added, until the increase in weight amounts to about 11 per cent of the dibenzopyrene-quinone employed, the reaction mixture being kept at about between 60° and 70° C. The reaction mixture is worked up as usual and a monochloro derivative obtained dyeing cotton strong yellow shades from a red vat and dissolving to a violet solution in concentrated sulphuric acid.

Example 18

66 parts of 3.4.8.9-dibenzopyrene-5.10-quinone are dissolved at room temperature in 660 parts of chlorosulphonic acid, while stirring. After adding 4 parts of iodine and 1 part of mercury, 100 parts of bromine are run in slowly, whereupon the temperature is raised to 70° C. The mass is stirred at the said temperature until the bulk of the bromine has been taken up, allowed to cool and worked up in the usual manner. The resulting product, of which an excellent yield is obtained, is a tribromo-3.4.8.9-dibenzopyrene-5.10-quinone, constituting an orange powder dissolving to a blue solution with a violet tinge in concentrated sulphuric acid and dyeing from a blue-red vat bright orange shades.

Example 19

44 parts of 3.4.8.9-dibenzopyrene-5.10-quinone are dissolved in 400 parts of oleum containing 23 per cent of $SO_3$, whereupon 1 part of antimony and 1 part of sulphur and then 35 parts of bromine are added while stirring. The temperature is then raised to between 65° and 70° C., and the mass is stirred at the said temperature, until all bromine has been taken up, then allowed to cool and worked up in the usual manner. The resulting tribromo-3.4.8.9-dibenzopyrene-5.10-quinone dyes more yellowish orange shades than the product described in Example 18, which is probably an isometric compound.

Example 20

40 parts of dichloro-3.4.8.9-dibenzopyrene-5.10-quinone obtainable according to the second paragraph of Example 7 are dissolved in 400 parts of chlorosulphonic acid and slowly warmed, while stirring, to 70° C. after the addition of 2.5 parts of iodine and 40 parts of bromine. The reaction mixture is kept for several hours at between 70° and 75° C., is then allowed to cool and worked up in the usual manner. The reaction product obtained, a dichloro-dibromo-3.4.8.9-dibenzopyrene-5.10-quinone according to analysis, is a yellow orange paste, and an orange powder when dry, dissolves in concentrated sulphuric acid to a blue solution and dyes cotton very fast clear golden yellow shades from a red violet vat. It has an essentially stronger tinctorial power, is faster against washing and dyes slightly more reddish tinges than the unsubstituted dibenzopyrene-quinone which dyes similar tints.

Example 21

49 parts of dibromo-3.4.8.9-dibenzopyrene-5.10-quinone obtainable according to Example 6 are dissolved in 500 parts of boiling chlorosulphonic acid. A current of chlorine is slowly passed into the solution to which 1.5 parts of mercury have been added, while raising the temperature to between 60° and 65° C. When the coloration of the solution of the reaction product in concentrated sulphuric acid begins to turn blue, the reaction mixture is allowed to cool and worked up in the usual manner. The dyestuff containing about 1 atom of chlorine and about two atoms of bromine per each molecule of the dyestuff is obtained in the form of an orange paste, forms an orange powder when dry, dissolves to a blue solution in concentrated sulphuric acid and dyes the vegetable fibre from a violet red vat similar shades as the dyestuffs described in Example 20.

Example 22

33.2 parts of purest 3.4.8.9-dibenzopyrene-5.10-quinone are dissolved in 330 parts of chlorosulphonic acid and the solution is slowly warmed to 60° C. after the addition of 3 parts of iodine. 9 parts of bromine are then run into the solution at the said temperature and the reaction mixture is stirred at between 60° and 70° C. until all of the bromine has been taken up, whereupon dry gaseous chlorine is introduced until a sample of the reaction product dissolves to a blue solution with a violet tinge in concentrated sulphuric acid. The reaction mixture is then allowed to cool and worked up in the usual manner. The monobromodichloro-3.4.8.9-dibenzopyrene-5.10-quinone obtained is an orange paste, and an orange powder when dry, dissolves to a blue solution with a violet tinge in concentrated sulphuric acid and dyes cotton clear strong golden yellow shades of excellent fastness from a blue red vat.

Monobromo-3.4.8.9-dibenzopyrene-5.10-quinone can be further chlorinated in the aforesaid manner.

Monobromo-monochloro- and dibromo-monochloro-3.4.8.9-dibenzopyrene-5.10-quinone can be obtained in an analogous manner.

Example 23

33.2 parts of 3.4.8.9-dibenzopyrene-5.10-quinone are dissolved in 300 parts of sulphuric acid containing 23 per cent of sulphur trioxide and heated, while stirring, after the addition of 3 parts of iodine and 36 parts of bromine to between 65° and 70° C. After all of the bromine has been taken up, the reaction mixture is allowed to cool, diluted if desired with 300 parts of concentrated sulphuric acid, poured into ice-cold water, the reaction product filtered by suction, washed, if desired, with a small amount of a diluted solution of soda and then washed again with water until neutral. The tetrabromo-3.4.8.9-dibenzopyrene-5.10-quinone, an orange paste with a reddish tinge, is an orange powder when dry dissolving to a blue solution in concentrated sulphuric acid, and dyes cotton from a blue vat orange shades.

Example 24

33.2 parts of 3.4.8.9-dibenzopyrene-5.10-quinone are introduced into a stirred solution of 50 parts of bromine and 3 parts of iodine in 300 parts of chlorosulphonic acid. Thereupon the temperature is raised to between 65° and 70° C., stirring being continued for several hours at the said temperature which is then raised to between 70° and 75° C. until a sample of the reaction product dissolves to a violet blue solution in concentrated sulphuric acid. The reaction mixture is then allowed to cool and worked up as usual. The tribromo-3.4.8.9-dibenzopydene-5.10-quinone obtained in the form of an orange paste dyes cotton from a violet red vat strong brilliant golden orange shades of excellent fastness.

Example 25

33.2 parts of pure 3.4.8.9-dibenzopyrene-5.10-quinone are dissolved while stirring in 300 parts of chlorosulphonic acid after the addition of 0.3 part of iodine and 40 parts of bromine. The temperature is slowly raised to between 65° and 70° C. which temperature is maintained until a sample of the reaction product dissolves to a violet blue solution in concentrated sulphuric acid. The reaction mixture is then allowed to cool and worked up as usual. The bromination product, a dibromo derivative according to analysis, dyes cotton from a blue red vat shades which are essentially more yellowish than those obtained from the dibromo derivative described in Example 6.

Other halogen carriers may be used instead of iodine.

Example 26

33.2 parts of 3.4.8.9-dibenzopyrene-5.10-quinone are dissolved in 240 parts of chlorosulphonic acid after the addition of 0.15 part of sulphur and 0.1 part of iodine. The temperature is raised to 65° C. and a dry current of chlorine is passed into the solution until a sample of the reaction product dissolves to a blue violet solution in concentrated sulphuric acid. The reaction mixture is then allowed to cool and worked up as usual. The chloro-3.4.8.9-dibenzopyrene-5.10-quinone obtained forms a yellow paste and a yellow powder when dry and dyes cotton from a violet vat very fast yellow shades with a greenish tinge.

Example 27

50 parts of bromine are introduced at ordinary temperature into a mixture of 33.2 parts of 3.4.8.9-dibenzopyrene-5.10-quinone, 150 parts of sulphuric acid containing 23 parts of sulphur trioxide, 150 parts of chlorosulphonic acid, 3 parts of iodine, while stirring, whereupon the reaction mixture is warmed to between 60° and 65° C. and kept at the said temperature until substantially all of the bromine has been taken up. The reaction product worked up in the usual manner, a hexabromo-3.4.8.9-dibenzopyrene-5.10-quinone according to analysis, dissolves in concentrated sulphuric acid to a blue solution and dyes cotton yellow shades from a blue violet vat.

Example 28

49 parts of the bromo-3.4.8.9-dibenzopyrene-5.10-quinone obtainable according to Example 2 are dissolved, while stirring, in 500 parts of chlorosulphonic acid. After the addition of 2.5 parts of iodine, chlorine is passed at between 60° and 70° C. into the reaction mixture until the weight thereof has increased by from 15 to 20 parts. After pouring the pure blue chlorosulphonic acid solution into 500 parts of concentrated sulphuric acid, the reaction mixture is passed onto ice. The dyestuff separating in yellow flakes is then worked up as usual. It crystallizes from nitrobenzene in small yellow needles and dyes the vegetable fibre yellow shades of excellent fastness to washing from a violet red vat. The analysis of the dyestuff points to about a trichloromonobromo derivative.

If chlorine is passed into the reaction mixture prepared as aforedescribed, until the increase by weight thereof amounts only to about 10 parts, a dyestuff separating in yellow flakes is obtained dissolving to a blue solution in concentrated sulphuric acid and dyeing the vegetable fibre from a violet red vat yellow shades of the same tint than that obtained from the unsubstituted 3.4.8.9-dibenzopyrene-5.10-quinone, the said dyeings being however excellently fast against washing.

What we claim is:—

1. As new articles of manufacture, vat dyestuffs of the dibenzopyrenequinone series containing at least two of the halogens chlorine, bromine and iodine which dye cotton from violet to violet red vats strong yellow to orange shades with a reddish tinge, dissolve in concentrated sulphuric acid with a blue to violet coloration and are difficultly soluble in organic solvents of high boiling point.

2. As new articles of manufacture, 3.4.8.9-dibenzopyrene-5.10-quinones containing at least one atom of bromine and at least one atom of chlorine per each molecule which dye cotton from violet to violet red vats strong yellow to orange shades with a reddish tinge, dissolve in concentrated sulphuric acid with a blue to violet coloration and are difficultly soluble in organic solvents of high boiling point.

3. As new articles of manufacture, 3.4.8.9-dibenzopyrene-5.10-quinones containing one atom of bromine and at least one atom of chlorine per each molecule which dye cotton from blue red vats strong and bright yellow orange shades, dissolve in concentrated sulphuric acid with a violet coloration and are difficultly soluble in organic solvents of high boiling point.

4. As a new article of manufacture, 3.4.8.9-dibenzopyrene-5.10-quinone containing about one atom of bromine and three atoms of chlorine and forming yellow needles which dyes cotton yellow shades from a violet red vat.

5. As new articles of manufacture, 3.4.8.9-dibenzopyrene-5.10-quinones containing at least two atoms of bromine and at least one atom of chlorine per each molecule which dye cotton from red violet to blue red vats golden yellow shades and dissolve in concentrated sulphuric acid with blue to blue violet colorations.

6. As a new article of manufacture, 3.4.8.9-dibenzopyrene-5.10-quinone containing two atoms of bromine and one atom of chlorine per each molecule forming an orange powder which dyes cotton golden yellow shades from a violet red vat and dissolves in concentrated sulphuric acid with a blue coloration.

7. As a new article of manufacture, 3.4.8.9-dibenzopyrene-5.10-quinone containing two atoms of bromine and two atoms of chlorine per each molecule which dyes cotton golden yellow shades from a red violet vat and dissolves in concentrated sulphuric acid with a blue coloration.

8. The process of producing derivatives of 3.4.8.9-dibenzopyrene-5.10-quinone containing different halogens, which comprises treating a 3.4.8.9-dibenzopyrene-5.10-quinone in a sulphuric acid in the presence of a halogen-transferring catalyst with two different halogenating agents.

9. The process of producing derivatives of 3.4.8.9-dibenzopyrene-5.10-quinone containing different halogens, which comprises treating 3.4.8.9-dibenzopyrene-5.10-quinone in a sulphuric acid in the presence of a halogen-transferring catalyst with two different halogenating agents.

10. The process of producing derivatives of 3.4.8.9-dibenzopyrene-5.10-quinone containing chlorine and bromine, which process comprises treating 3.4.8.9-dibenzopyrene-5.10-quinone in a sulphuric acid in the presence of a halogen-transferring catalyst with a chlorinating and a brominating agent.

11. The process of producing derivatives of 3.4.8.9-dibenzopyrene-5.10-quinone containing chlorine and bromine, which comprises treating 3.4.8.9-dibenzopyrene-5.10-quinone in chlorosulphonic acid in the presence of a halogen-transferring catalyst with a chlorinating and a brominating agent.

12. The process of producing derivatives of 3.4.8.9-dibenzopyrene-5.10-quinone containing chlorine and bromine, which comprises treating 3.4.8.9-dibenzopyrene-5.10-quinone in chlorosulphonic acid in the presence of iodine with a chlorinating and a brominating agent.

13. The process of producing derivatives of 3.4.8.9-dibenzopyrene-5.10-quinone containing chlorine and bromine, which comprises treating 3.4.8.9-dibenzopyrene-5.10-quinone in chlorosulphonic acid in the presence of iodine first with a chlorinating and then with a brominating agent.

In testimony whereof we have hereunto set our hands.

MAX ALBERT KUNZ.
GEORG KRAENZLEIN.
KARL KOEBERLE.
MARTIN CORELL.
ERICH BERTHOLD.
HEINRICH VOLLMANN.